United States Patent [19]

Bauer

[11] Patent Number: 5,018,668
[45] Date of Patent: May 28, 1991

[54] METHOD AND APPARATUS FOR INITIATING ROTATION OF VERTICAL AUGER DEVICES

[75] Inventor: Norman A. Bauer, Watertown, Minn.

[73] Assignee: Ag-Chem Equipment Co., Inc., Minnetonka, Minn.

[21] Appl. No.: 502,767

[22] Filed: Mar. 30, 1990

[51] Int. Cl.⁵ .................. B05B 17/00; A01C 15/14
[52] U.S. Cl. ............................... 239/655; 239/675; 198/675
[58] Field of Search ............ 239/655, 672, 675, 677, 239/684; 198/675

[56] References Cited

U.S. PATENT DOCUMENTS

| | | | |
|---|---|---|---|
| 2,206,876 | 7/1940 | Chater. | |
| 3,023,970 | 3/1962 | Knoell. | |
| 3,568,937 | 3/1971 | Grataloup. | |
| 3,771,643 | 11/1973 | Schmidth | 198/675 |
| 4,213,565 | 7/1980 | Jackson. | |
| 4,260,107 | 4/1981 | Jackson. | |
| 4,449,667 | 5/1984 | Tyler. | |
| 4,600,150 | 7/1986 | Zelasko | 198/675 |
| 4,790,484 | 12/1988 | Wall | 239/655 |
| 4,913,344 | 4/1990 | Bauer | 239/655 |
| 4,964,575 | 10/1990 | Takata | 239/655 |

FOREIGN PATENT DOCUMENTS 6341307 2/1988 Japan .................... 198/675

Primary Examiner—Andres Kashnikow
Assistant Examiner—Christopher G. Trainor
Attorney, Agent, or Firm—Haugen and Nikolai

[57] ABSTRACT

An improved drive system for pneumatic spreader systems for effective distribution of particulate material onto agricultural fields from a plurality of elongated delivery tubes or booms. The improved drive means of the present invention is utilized to power the lift-auger bringing particulate material from the hopper to the distributor head, and is provided with dual operating parameters or modes, the first mode being low-speed high-torque, the second mode being high-speed low-torque. The low-speed high-torque mode is designed to provide power to initially "break-loose" or otherwise activate the rotation of the auger, with the high-rotational speed being utilized for normal operation. The system is designed to automatically convert from the low-speed mode to the high-speed mode after only a short interval of time, such as may be required to complete from between 1 and 3 revolutions of the lift-auger.

2 Claims, 3 Drawing Sheets

METHOD AND APPARATUS FOR INITIATING ROTATION OF VERTICAL AUGER DEVICES

CROSS-REFERENCE TO RELATED APPLICATIONS

The present invention finds particular utility for use in combination with those certain spreader systems such as disclosed in co-pending applications Venturi System for Agricultural Spreaders of Solid Particles, Ser. No. 07/315,277, filed Feb. 24, 1989, now abandoned, and Boom Flow Control Mechanism for Pneumatic spreaders, Ser. No. 07/358,666, filed May 30, 1989 both being assigned to the same assignee as the present invention.

BACKGROUND OF THE INVENTION

The present invention relates generally to an improved drive means for the lift-auger utilized in pneumatic spreader systems for distribution of granular agricultural crop treating chemicals, and more particularly to a system for achieving uniform distribution of such materials through the use of an improved drive means for initiating the rotation of the lift-auger, and for maintaining the rotation thereof while in the normal running mode. The apparatus of the present invention is designed to provide dual-torque ranges and dual-rotational speeds to accomplish initial rotation of the auger upon start-up, followed by maintaining the rotation at a constant rate while in the normal running mode. The drive system of the present invention is effective for achieving uniform rates of application, particularly at the point of initial start-up following an interval of shut-down of the lift-auger.

Pressurized pneumatic systems utilizing a single distribution head delivering or metering a supply of granular or particulate material for controlled discharge of such material from a plurality of elongated booms have been employed in the past, however the systems currently in use normally deliver granular products through use of a lift-auger which is designed to rotate under conditions of substantially constant speed and constant torque. Occasionally, and particularly when the system has been shut-down for an interval of time with material remaining in the lift-auger, some uneven flow may occur at the time of lift-auger start-up. The non-uniformity may result from the packing of particulate material within the auger during the interval of shutdown, and upon start-up, the rotation of the lift-auger may occur in a non-uniform fashion. The present invention provides a reliable system for maintaining the distribution and application rate at a substantially uniform and constant level through the active booms.

Agricultural techniques require the utilization of soil treating agents to either encourage, discourage, destroy, or inhibit plant growth. Such agents may generally be characterized as crop treating chemicals, and include materials designated as nutrients such as fertilizers, and pesticides such as insecticides and herbicides including pre-emergent and/or post-emergent growth inhibitors. Accordingly, the term "crop treating chemical" is used in a comprehensive sense to incorporate those various ingredients utilized in agriculture to treat either the soil, the growing crop or plants, or certain insects which may damage the crop. Active materials used for treatment are commonly found in one of three forms, either water soluble, water wettable, particulate solid or in surface-impregnated solid form. In connection with the present invention, granular materials and/or surface-impregnated (wetted) granular materials are of particular interest, with the system of the present invention being particularly adapted for use in connection with the selective and uniform distribution of such materials through the system and onto the soil or other surfaces being treated.

In the treatment of agricultural fields and crops through spreading of one or more active treating ingredients, the efficiency of the treatment operation may be enhanced if the distribution of the ingredients is maintained at a uniform and/or controllable rate particularly at point of initiation of lift-auger rotation. Uniform application rates have become an important factor, particularly with the use of certain pesticides and/or herbicides which require a predetermined application rate in order to be effective, and not harmful to the crop being treated. Occurrences of under-application or over-application of crop treating materials may result in application being either ineffective or, in certain instances, harmful to the crop. Additionally, the efficiency of the operation may be enhanced if the actual load required to be carried by the spreading equipment is reduced. Therefore, the utilization of dry particulate solids will substantially reduce the load requirement, inasmuch as water or other treatment medium or treatment vehicle is not required The need for multiple passes may be reduced if surface-impregnated granular material may be uniformly spread, such as through the use of a granular fertilizer having a surface impregnated with a particular pesticide. The utilization of pressurized pneumatic systems will normally eliminate or substantially reduce the vehicle load by eliminating the need for large quantities of water, since pneumatic systems normally utilize a compressor to generate a supply of compressed air in lieu of a liquid plus liquid pressure source as a means to create a medium for accomplishing delivery of the treating ingredient onto the soil.

Pneumatic spreader systems typically are mounted upon self-propelled vehicles, thereby providing a means for achieving the distribution. In order to render these systems efficient, elongated booms are employed, and it is not uncommon for such booms to extend outwardly a distance of 20 feet or more from the center axis of the vehicle. When the operator reaches the end of a field, the entire capability of the system is shut down for turn-around to avoid any excessive or double-coverage. In order to render the system more highly advantageous, this interruption of flow is achieved while maintaining substantially uniform application rates upon start-up. An added advantage of the system permits intermittent shut-down of certain booms when the fertility index varies across the field being treated, with uniform distribution being achieved upon the occurrence of start-up.

During normal operation, the lift-auger becomes loaded with granular material. In those instances when the machine reaches the end of the field, and is being turned around for initiation of the next application run, the material remaining in the auger tends to flow downwardly along the ramp formed by the auger flutes, thereby becoming more densely packed within the confines of the auger. Occasionally, on these occurrences, the auger resists initial start-up until the packed material breaks away, and auger rotation is commenced. Initiation of auger rotation accordingly requires higher-than-normal torque, and preferably lower-than-normal running rates until complete breakaway occurs. In most instances, the interval of time required for break-away is equivalent to somewhere between 180 degrees of auger rotation, or somewhat greater period. In order to accomplish the desired results, the system initially operates in a low-speed high-torque mode until pressure in the system driving the hydraulic motor rotating the auger reaches a certain predetermined level. For most common systems, this low-speed high-torque mode will be retained until the system pressure reaches approximately 100 psi. By way of example, the normal operating pressure of a typical system of this type is 300 psi, it being understood that a pressure of 100 psi is a level which while below, is substantially equal to normal operating pressure. At that point in time, the system is designed to switch to the high-speed low-torque mode for continuous and ongoing operation. A spool valve is commonly utilized to achieve this conversion. In this fashion, the lift-auger reaches its high speed operational mode promptly, thus reducing the tendency toward pulsations in product delivery.

As indicated, uniformity of distribution of particulate materials depends to a certain extent upon operation of the entire system, including the distribution head, the material transferring conduits, as well as the lift-auger In order to preserve operational integrity and predictability, therefore, uniformity of rate of rotation of the lift-auger is a desirable objective and goal. The features of the present invention permit intermittent shut-down of the system, it having been found that operation of the system may be resumed while preserving uniformity of ongoing distribution of particulate solids from the system. The features of the present invention have been found desirable for improving the performance of systems utilizing lift-augers, and particularly for improving the performance of such systems when the operation of the lift-auger has been temporarily interrupted.

This uniformity of performance is achieved through the utilization of a lift-auger drive system which employs dual-torque ranges as well as dual rates of rotation.

SUMMARY OF THE INVENTION

Briefly, and in accordance with the present invention, an improved solid granular chemical applicator system is provided which improves the performance of the lift-auger by providing a means for selectively applying high torque and low rotational speed to the auger upon initial start-up, and for a finite period of time thereafter, while maintaining a low-running torque and uniform rate of rotation for the auger following initial start-up. A particular advantageous feature of the present invention is its ability to effectively handle and utilize impregnated or surface treated granular materials such as pesticide/herbicide impregnated fertilizers while maintaining desired and uniform application patterns without creating unusual material build-up or clogging of individual booms, or pulsation of output. The improved system is normally and preferably mounted upon a vehicle chassis such as the chassis of a self-propelled vehicle including either a tractor or a trailer. The system includes a reservoir with the source of supply of agricultural crop treating chemicals in granular or particulate solid form to be distributed, such as, for example, a nutrient such as a fertilizer and/or a pesticide such as an insecticide or herbicide, along with the lift-auger for delivering the material into the distribution head, and thence into the spreader and distribution mechanism.

The applicator systems of the present invention are typically provided with a number of conventional components, including the following:
  (a) a reservoir or hopper for retaining a supply of particulate solids;
  (b) a means of conveying the granular particulate solids to lift-auger which delivers the material to a distribution head where the supply is metered by being divided into a number of aliquot portions, with this conveying means being driven with a variable speed motor so as to control the quantity of granular particulate material delivered to the distribution head;
  (c) a means for delivering the metered aliquot portions to the elongated booms; and
  (d) a means, such as a blower or compressor for delivering a supply of compressed air, to move the material along with a flow of air outwardly through the booms and ultimately to a point of discharge. These systems may optionally be provided with the following:
  (e) a means for impregnating the individual granular particles with an additional crop or soil-treating ingredient, such as an aqueous coating of a pesticide material Turning to the lift-auger and distribution head components briefly and individually, a lift-auger is provided which carries the granular or particulate material upwardly from a horizontal conveyor upwardly to the inlet of the distribution head. As indicated above, whenever motion in the lift-auger is interrupted, residual material in the auger may tend to become compacted and otherwise bind against the cylindrical walls of the auger, and render it necessary to initially "break-away" the material from the auger walls. The system of the present invention achieves this result while preserving uniformity of flow of particulate material through the system.

As indicated hereinabove, the system of the present invention has been found to function well in combination with that certain system disclosed in applications Ser. No. 07/315,277, filed Feb. 24, 1989, and Ser. No. 07/358,666, filed May 30, 1989, and referred to hereinabove, with the apparatus of the present invention being disclosed while mounted within, and functioning typically with such systems.

It has been found that the auger rotation initiate or auger initiate system and means of the present invention provides for an initial break-away of the auger to be followed by even and positive flow for granular and/or particulate materials present in the system, including the flow or movement of these solids through those certain booms which remain operative. Furthermore, this uniform flow of granular or particulate material is maintained without creating additional tendencies toward unusual distribution patterns such as through a pulsating outward flow.

Therefore, it is a primary object of the present invention or provide an improved system for delivery of granular material or particulate solids from a pressurized pneumatic system, wherein an improved auger initiate system is provided in order to achieve an initial break-away of the auger to be followed by maintaining uniform delivery of granular or particulate solids into the delivery system.

It is a further object of the present invention to provide an improved auger initiate system which provides a combination of initial high-torque and low-rotational velocity mode until the auger has become freed-up for normal delivery, to be followed shortly by a second low-torque high-rotational velocity mode for continued normal operation, thereby achieving substantially uniform distribution of the material from the system.

It is yet a further object of the present invention to provide an improved auger initiate system for pressurized pneumatic spreader systems and wherein means are provided to start rotation of the auger after a period of interruption of operation, whereby rotation of the auger is initiated by delivery of high-torque an low-rotational velocity for a relatively short but finite period of time, to be followed by operation at relatively low-torque and high-rotational velocity.

Other and further objects of the present invention will become apparent to those skilled in the art upon a study of the following specification, appended claims, and accompanying drawings.

DESCRIPTION OF THE PREFERRED EMBODIMENT

Figure 1:
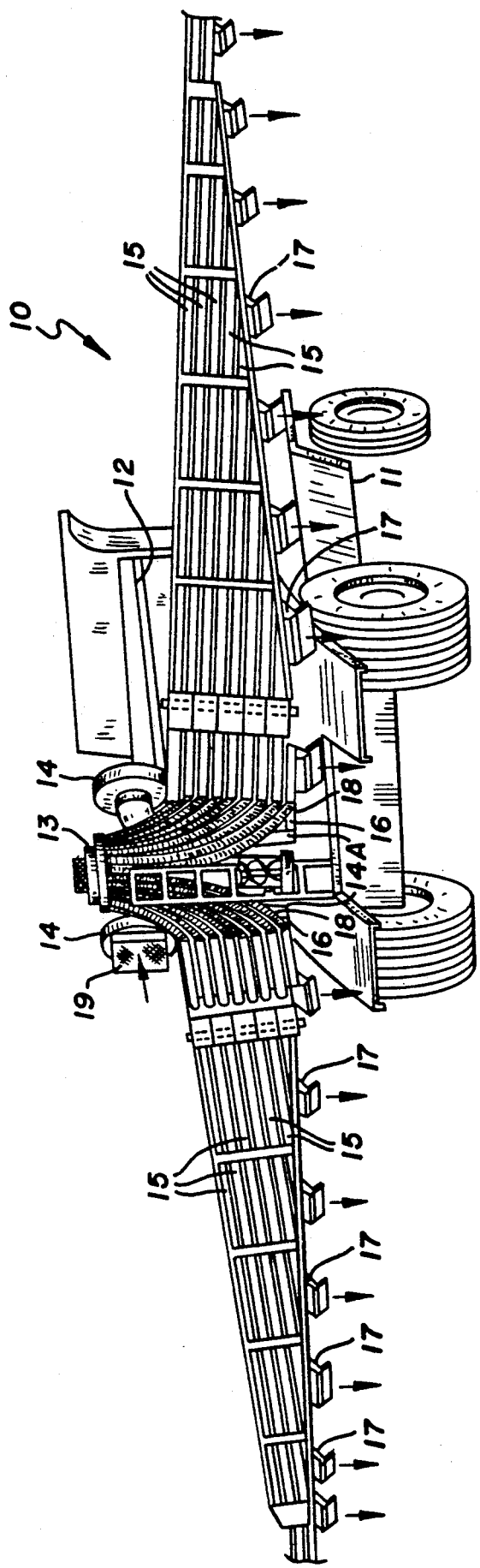
FIG. 1 is a perspective view of the side and rear portions of a typical vehicle chassis supporting a vehicular-mounted system incorporating a distribution head, a compressor, and a plurality of elongated hollow delivery booms, and wherein the distribution head is supplied with granular material from an auger powered by the improved auger drive means of the present invention.

In accordance with the preferred modification of the present invention, and with particular attention being directed to FIG. 1 of the drawings, the pressurized pneumatic distribution system generally designated 10 is mounted upon vehicle chassis 11, and includes a reservoir 12 for retaining a source of supply of granular or particulate solids to be distributed through the system. A distribution head assembly 13 partially broken away to show the lift-auger device driven by an hydraulic motor is provided for apportioning the particulate solids received or delivered from reservoir or hopper 12 by the lift-auger and to be and includes a reservoir 12 for retaining a source of supply of granular or particulate solids to be distributed through the system. A distribution head assembly 13 partially broken away to show the lift-auger device driven by an hydraulic motor is provided for apportioning the particulate solids received or delivered from reservoir or hopper 12 by the lift-auger and to be divided into a plurality of generally equal or aliquot portions. Also, impregnation valve means may be provided to controllably impregnate the surface of fertilizer with a pesticide/herbicide, this typically occurring as the granular material moves into the vertical auger of the distribution system. Suitable impregnation devices for accomplishing the wetting operation are commercially available. Also, fertilizers which are pre-impregnated with specific types of pesticides and/or herbicides are commercially available.

A plurality of elongated hollow delivery booms 15—15 are provided to receive, transfer or move laterally outwardly, and ultimately spread the solids on the ground, with the booms being of predetermined and differing lengths, and extending laterally outwardly of the vehicle from proximal ends 16—16 to distal discharge ends 17—17. A source of compressed air such as fan blower 14 for the pressurized pneumatic system is utilized to create a flow of pressurized air into a plenum or manifold 14A and from the plenum into the proximal or manifold 16—16 of each boom, and ultimately through each of the hollow elongated booms 15 to outlet or discharge. Such blowers or other sources of compressed air, and their arrangement in this type of system are, of course, well known to those in the art, and need not be described in detail here. As is apparent in FIG. 1, a cooler device may be employed in combination with one of the blowers in order to cool hydraulic fluid being used to drive components within the system. A plurality of tubular feed members 18—18 are also provided, with each of such tubular feed members extending between and coupling a selected output of the distributor head 13 to a selected one of said delivery booms 15—15. Also, as is conventional, the tubular feed members 18—18 provide for delivery of each of the aliquot portions into the elongated boom 15 at a point adjacent the proximal end 16, and for ultimate delivery to the distal discharge end 17 of the boom. Also, as indicated, such spreader structures are known in the art and need not be discussed and described in detail here. One such spreader structure is illustrated in U.S. Pat. No. 3,568,937 to Grataloup, with another such system being disclosed in U.S. Pat. No. 2,206,876 to Chater.

Figure 2:
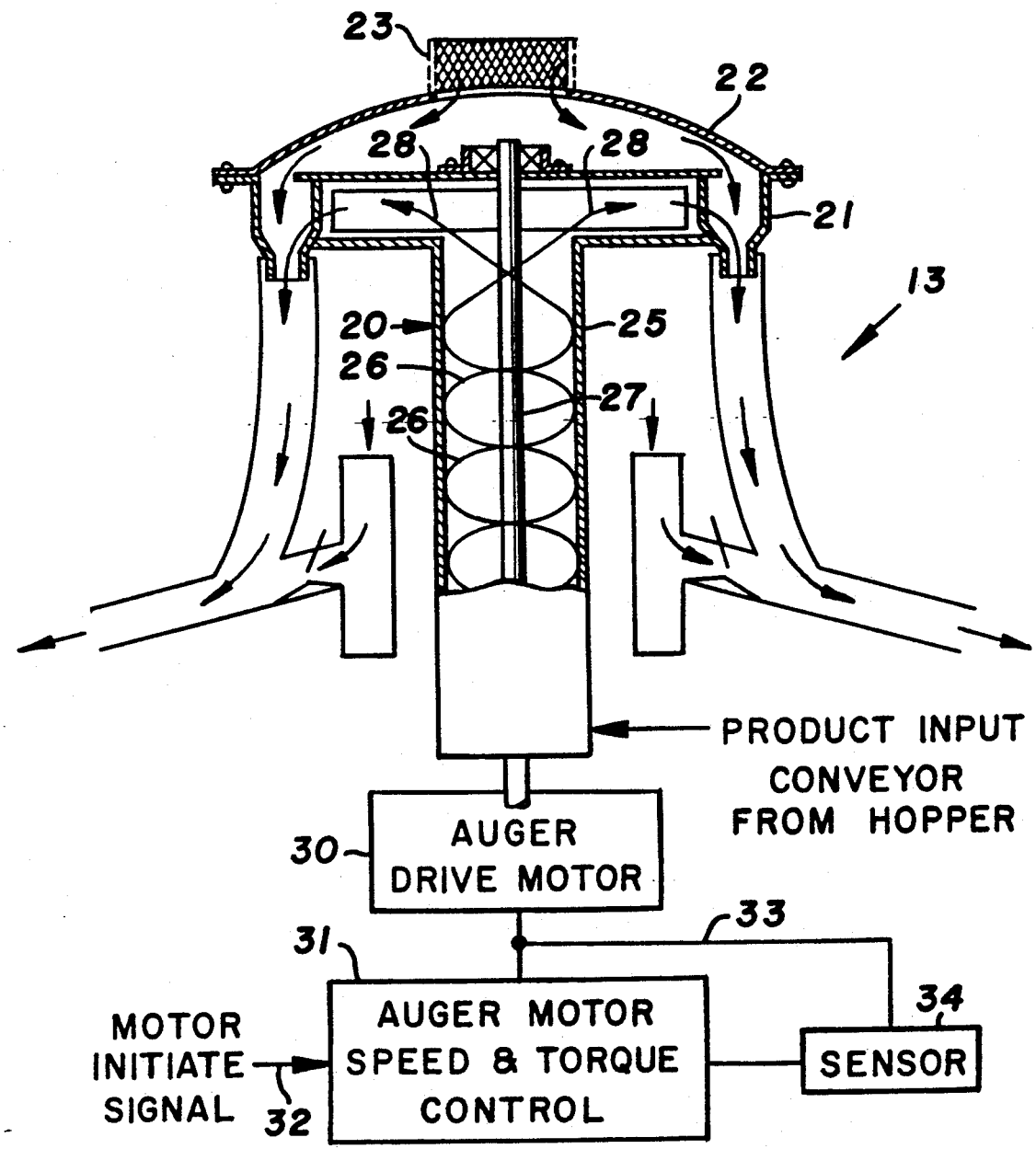
FIG. 2 is a view taken through the diameter of a typical distribution head being supplied by a vertical auger, and wherein the auger is lowered by the improved drive means of the present invention.

Attention is now directed to FIG. 2 of the drawings wherein the details of the distribution head assembly 13 are illustrated. The distribution head assembly includes lift-auger generally designated 20, along with an upper head 21 with a shroud or cover 22 vented to atmosphere as at 23 disposed thereover. The details of the lift-auger 20 and the remaining features of the distributor head disposed thereover are illustrated in detail in co-pending application Ser. No. 07/315,277 referred to hereinabove, and reference is made thereto for further details of this portion of the device with the details of the disclosure in application Ser. No. 07/315,277 being incorporated by reference herein.

The lift-auger assembly 20 includes auger sleeve or cylinder 25 which envelopes a multi-fluted auger 26 mounted upon and driven by auger shaft 27. Material, such as particulate material lifted along auger 20, is discharged at the top through and along the path of arrows 28—28 as is conventional in this type of structure.

As is set forth in FIG. 2, auger 26, through shaft 27, is operatively and drivingly coupled to auger drive motor 30. As indicated hereinabove, the drive parameters of which are controlled by auger motor speed and torque control 31. The auger drive motor 30 is ultimately controlled, of course, by motor initiate signal as shown schematically as at 32. Auger drive motors which have been found useful in connection with devices of the type disclosed herein are commercially available, with one such motor being available from Eaton Co. of Eden Prairie, Minn. under the code designation 2000 Series. Motor speed and torque controls for such drive motors are also commercially available.

The operational characteristics of auger drive motor 30 are such that it is capable of operation in two modes, the first being a low-speed high-torque mode, the second being a high-speed low-torque mode. In the commercially available devices, suitable built-in valving is available to provide these dual modes of operation on an automatic basis.

Specifically, when the pressurized hydraulic fluid is initially applied to the motor, it functions in its low-speed high-torque mode, and continues in that mode until the pressure of the fluid to the motor reaches an elevated state, such as in the range of 100 psi. The time interval required for the pressure to increase to this level is sufficient for approximately 1 to 3 revolutions of the output shaft, such as directed to the auger shaft 27. In order to provide this operational characteristic, a sense line is coupled to the incoming line pressure of drive motor 30, such as at 33, to sensor 34. The output of sensor 34 is, in turn, coupled to auger motor speed and torque control 31, thereby controlling the flow of fluid to auger drive motor 30. This drive arrangement is sufficient for permitting the auger to initially "break-loose" any solid material within the confines of auger sleeve 25, and thereby initiate driving rotation of auger shaft 27 and its accompanying flutes 26—26.

After achieving initial break-away of the auger, the drive motor 30 will convert its operation to high-speed low-torque, consistent with the operating requirements of the system. The rotation of lift-auger is preferably undertaken at high speed in order to prevent product quantity delivery pulsations. Thus, the high-speed mode tends to smooth out operational parameters and thus increase uniformity in spread density.

Figure 3:
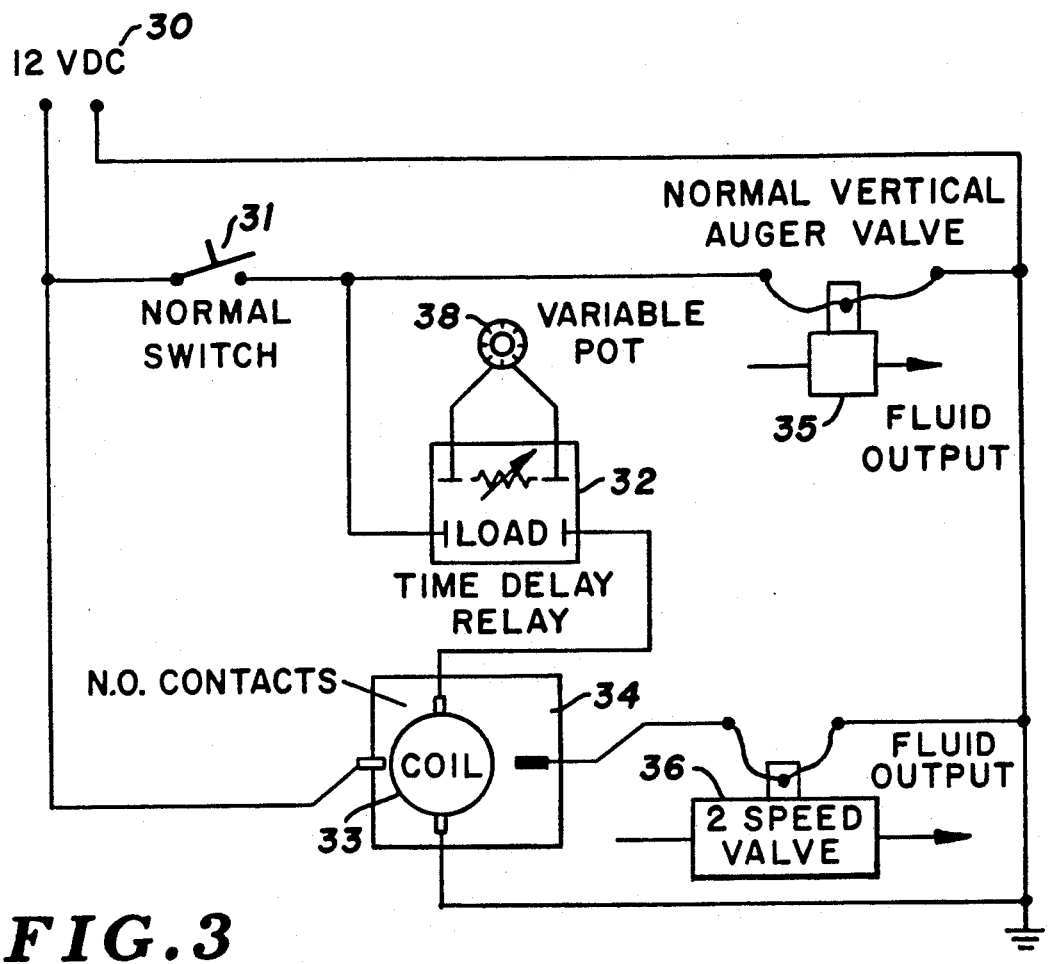
FIG. 3 is a schematic diagram of an electrical control system which may be utilized in accordance with the present invention to control the drive for the hydraulic motor powering the auger.
Figure 4:
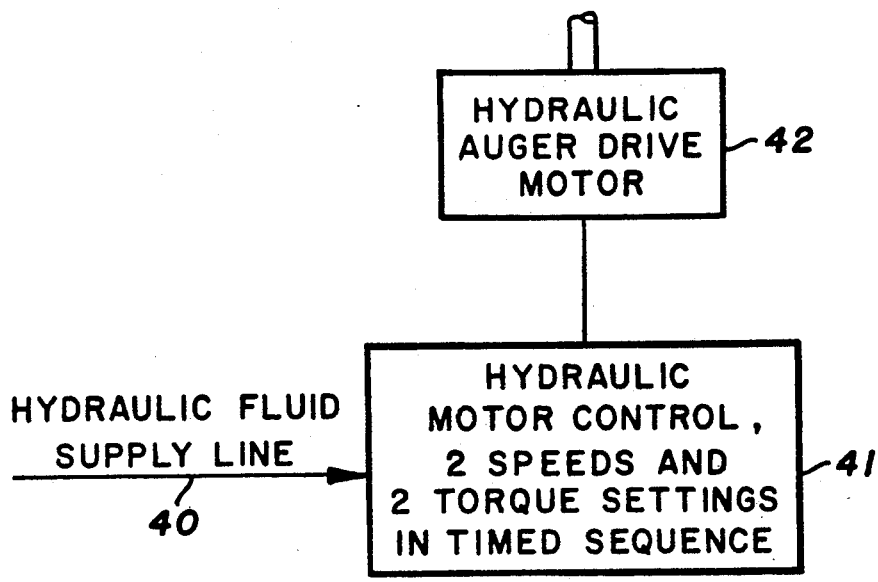
FIG. 4 is a schematic block diagram of a hydraulic system which may be utilized to deliver hydraulic fluid to the motor driving the auger.

Attention is now directed to FIG. 3 of the drawings wherein schematic illustration of a control system is illustrated A 12-volt DC power supply is illustrated at 30, with the existing on-off switch for the system being illustrated at 31. Time delay relay 32 is utilized to control flow of power to coil 33, with coil 33 including a set of normally open contacts as at 34. The existing or normal vertical lift-auger fluid power supply valve is shown at 35, with the fluid output being directed to the hydraulic auger drive motor, as is conventional. Valve 36 is supplied as a two—speed valve, with its fluid output also being directed to hydraulic auger drive motor 30, but providing for motor drive in the low-speed high-torque mode. Time delay relay 32 is provided with a variable potentiometer as at 38 in order to control the on-time of the relay, and thus the time interval during which contacts 34 are closed.

Upon closing of contacts 34, valve 36 is utilized to provide its fluid output directly to hydraulic auger drive motor 30, thus providing the low-speed high-torque operational mode. Upon interruption of output of time delay relay 32, the time interval of which is controlled by the setting of potentiometer 38, contacts 34 are opened, thus permitting the drive motor to function on its existing valve 35, thereby converting to the high-speed low-torque operational mode.

Attention is now directed to FIG. 4 of the drawings wherein the hydraulically controlled operational mode is illustrated. Hydraulic fluid supply line 40 is provided in order to deliver fluid under pressure to the multi-speed and torque motor control 41. The operational characteristics of this control provide for the dual operational mode of drive motor 42. As indicated above, the hydraulic multi-speed and torque motor control 41 is built into and thus commercially available in hydraulic drive motors, such as of the type available from Eaton Corp. of Eden Prairie, Minn. under the code designation 2000 Series.

In order to preserve operational integrity of the system, and furthermore control the uniformity of output, the initial break-loose driving mode for the lift-auger is undertaken for a finite but relatively short interval of time. As indicated, from between 1 and 3 revolutions of the shaft are normally sufficient to provide proper start-up, and thus permanent uniform application throughout the system. Because of the operational mode shifting at this early point in time, the low operational rate is able to preserve uniformity. The period of time required for the high-torque mode is dependent to a certain degree upon the product loading within the auger. As the product loading increases, the time interval will correspondingly increase, thus further contributing to uniformity in spreading density.

In certain instances, in the event the auger becomes locked in place, and difficult to break-loose within the design parameters, the system contemplates the utilization of a continuous "on" switch which can be manually operated, and maintained until appropriate auger loosening occurs.

It will be further appreciated that the details of the design disclosed here are for purposes of illustration only, and are not to be construed as a limitation upon the scope of the present invention.

What is claimed is:

1. In combination with a pressurized pneumatic system for substantially uniform distribution of particulate solids upon the soil from a system mounted upon a self—propelled vehicle and including a reservoir with a source of supply of particulate solids to be distributed, a distribution head means including a lift-auger for metering and apportioning particulate solids from said reservoir into a plurality of generally aliquot portions, a plurality of elongated hollow delivery booms extending laterally outwardly of said vehicle from a proximal end to a distal discharge end, the improvement comprising:

(a) said drive motor comprising an hydraulic motor with a first low-speed/high-torque running mode and a second high-speed low-torque running mode, and means for initially operating said drive motor in said first mode and for converting said first mode to said second mode following a finite period of time, the arrangement being such that operation in such first mode continues until auger break-away on initial rotation and wherein operation in said second mode is the normal operational mode.

2. The system as defined in claim 1 being particularly characterized in that said conversion from said first operational mode to said second operational mode occurs upon fluid pressures to said hydraulic motor rising to a level substantially equal to said normal operating pressure.

* * * * *